Patented Oct. 31, 1944

2,361,847

UNITED STATES PATENT OFFICE 2,361,847

AROMATIZATION OF STEROID COMPOUNDS AND MORE ESPECIALLY TO THE PRODUCTION OF ESTRONE- AND ESTRADIOL-LIKE COMPOUNDS AND OF THEIR DERIVATIVES FROM $\Delta_{1,2;4,5}$-ANDROSTADIENOL-17-ONE-3

Hans Herloff Inhoffen, Berlin-Wilmersdorf, Germany, assignor to Schering Corporation, Bloomfield, N. J., a corporation of New Jersey No Drawing. Application May 7, 1941, Serial No. 392,282. In Germany September 4, 1937

9 Claims. (Cl. 260—397.5)

This invention relates to the aromatization of steroid compounds and more especially to the production of estrone- and estradiol-like compounds and of their derivatives from $\Delta_{1,2;4,5}$-androstadienol-17-one-3, and is a continuation in part of my copending application Serial No. 166,453.

In application Serial No. 166,453 a process is described for the production of 17-oxo- or 17-hydroxy compounds of the estrane series, comprising subjecting 3-ketones of steroids or their enolic derivatives of the general formula

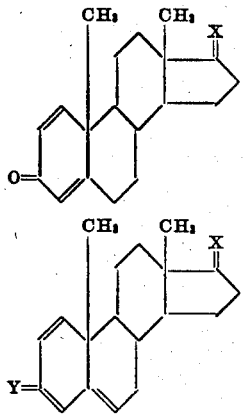

wherein X represents a member of the group consisting of oxygen and the group

wherein Y is a member of the group consisting of hydrogen, the hydroxy group and a group convertible to the hydroxy group, and R is a hydrocarbon radical which may be substituted, or hydrogen when Y is a hydroxy group or a group convertible thereinto, to a thermic procedure and to hereafter subjecting, if necessary, the products obtained to the action of means capable of transforming a side chain eventually present at the carbon atom 17 to an oxo- or a hydroxy group.

Now I have found that in an especially efficacious manner estradiol or its derivatives may be obtained from steroid compounds by subjecting $\Delta_{1,2;4,5}$-androstadienol-17-one-3 or its esters or their enolic derivatives as starting materials to the thermic process described in the copending application. For this purpose the starting material is heated, for instance, in an evacuated sealed flask to temperatures of above 300° C., either in solid form or dissolved in suitable solvents, e. g. in cyclohexanol.

The reaction product is then extracted with alkaline solutions. The alkaline extracts are acidified and extracted with suitable organic solvents, for example, with ether, and from said extracts the phenolic constituents are isolated. From the phenolic fraction estradiol or its derivatives are isolated, preferably by means of its compounds with urea, as they are described in the U. S. application Serial No. 317,887.

The following examples illustrate the process, without, however, limiting the same to them:

Example 1

4 grs. of $\Delta_{1,2;4,5}$-androstadienol-17-one-3 are heated in an evacuated sealed tube for 12 minutes to 320–325° C. After cooling the brown oil formed is dissolved by means of ether under addition of some chloroform. This solution is repeatedly extracted first with a 5%, then with a 10% solution of potassium hydroxide in water. By these means it is possible to separate the phenolic components into various fractions according to their acidity. After acidification and extraction with ether the different fractions are distilled in a high vacuum at 170–180° C. in order to remove the resins present in these extracts.

The first fraction, 1,212 grs., is further divided up into several sub-fractions by adsorption on aluminum oxide. The elution therefrom is performed by means of a mixture consisting of 80 parts of benzene and 20 parts of ether. From the second elution crystals melting at 155–160° C. are isolated. By means of ether-petrol ether further recrystallization from a mixture of ether and petrol ether 0.176 gr. of crude estradiol are obtained melting at 163–164° C. For further purification this product is dissolved, while heating, in a solution of urea in methanol, saturated at room temperature and the solution is allowed to crystallize. This recrystallization is twice repeated and yields a molecular compound of estradiol and urea, melting at 217° C., which is split up into its components by means of hot water. By recrystallization from aqueous ethanol and from 96% ethanol 28 mgrs. of pure estradiol of M. P. 172–175° C. and a specific rotation of $[\alpha]_D^{22} = +73.3°$ are obtained. It proved to be identical with the genuine estradiol with regard to mixed melting point, adsorption spectrum, specific rotation, and estrogenic activity since it shows, when tested on the spayed female rat, an activity of 1 i. U. in 0.12–0.15γ.

For further identification the monobenzoate of M. P. 189–190° C. and the diacetate of M. P. 125–126° C. were prepared which proved also to be identical according to their melting point and estrogenic activity with the corresponding derivatives of genuine estradiol.

By treatment with urea further amounts of estradiol can be recovered from the mother liquors, yielding, thus, in all 300 mgrs. of estradiol. Besides estradiol other active compounds of the estrane series are formed, among others most probably compounds of the equiline series.

After removing all estradiol by means of its urea-compound the remaining solution is evaporated in vacuo. Thus, 1.77 grs. of a dark brown viscous oil are obtained that is treated with Girard's reagent T for the isolation of the ketonic parts. For this purpose it is dissolved in 20 ccs. of absolute ethanol, to this solution there are added 1.7 grs. of Girard's reagent T dissolved in 1.7 ccs. of glacial acetic acid, and the mixture is boiled under reflux on the water bath for two hours. After cooling the mixture is poured into ten times its volume of ice water, containing 1.7 grs. of soda and three times extracted with 150 ccs. of ether each in order to remove the non-ketonic constituents, thereby taking care that the mixture is well cooled. The yield of said oily non-ketonic constituents amounts to 1,337 grs. The aqueous solution is acidified with dilute sulfuric acid and heated to 40° C. for one hour. After cooling, the solution is extracted with ether. The ethereal solution is then dried with anhydrous sodium sulfate and the ether is evaporated. The residue is distilled in a high vacuum at a bath temperature of 160–180° C., whereby 0.166 grs. of a colourless oil distills off crystallizing on triturating with a little ether. After washing with ether the colourless crystals melt at 225–230° C., becoming of reddish colour at 205–215° C. For further purification they are recrystallized from a mixture of acetone and ether, melting then at 240–243° C. When mixed with genuine estrone the melting point shows no depression. Also the absorption spectrum of this product is identical with that of the genuine estrone. Furthermore, the product is estrogenically fully active on the spayed female rat with 0.8γ.

*Example 2*

120 mgrs. of $\Delta_{1,2;4,5}$-androstadienol-17-one-3 and 1.5 ccs. of cyclohexanol are heated for 12 minutes in an evacuated and sealed tube to 320–325° C. The reaction mixture is dissolved in ether and subjected to steam distillation, whereby the cyclohexanol is removed. The remainder is dissolved in ether, the ethereal solution extracted several times with a 5% solution of potassium hydroxide in order to remove the phenolic components. The combined alkaline extracts are acidified with dilute sulfuric acid and extracted with ether. The ethereal solution is washed with water, dried and evaporated, yielding thus, 44 mgrs. of an oil which is dissolved in 1 cc. of a solution of urea in methanol, saturated at room temperature. After allowing the mixture to stand for some hours, 17 mgrs. of the urea compound, melting at 208–212° C., are precipitated. The compound is recrystallized from a urea solution in methanol and split up by means of water. The estradiol obtained is recrystallized from aqueous alcohol, whereby 10 mgrs. of estradiol melting at 172–173° C. are obtained.

*Example 3*

0.3 gr. of androstadienolone are heated with 4 ccs. of tetrahydro-naphthalene for half an hour to 380° C. in an evacuated sealed tube. From the reaction mixture the phenolic constituents are extracted by treating it first with a 5%, then with a 10% solution of potassium hydroxide. After acidification of the alkaline extracts the phenols are extracted in ether. The ethereal solution is washed with water, dried and evaporated. It yields 88 mgrs. of a clear oil, which is treated with 2 ccs. of a solution of urea in methanol, saturated at room temperature. 51 mgrs. of the estradiol urea compound are obtained, yielding when split up 42 mgrs. of estradiol, corresponding to 14.5% of the theoretical yield.

*Example 4*

0.3 gr. of androstadienolone, 75 mgs. of sodium ethylate and 4 ccs. of tetrahydro-naphthalene are heated to 380° C. according to Example 3. 110 mgrs. of phenolic compounds are obtained, yielding 27 mgrs. of the estradiol urea compound.

*Example 5*

0.3 gr. of androstadienolone and 4 ccs. of quinoline are heated for 35 minutes to 380° C. according to Example 3. The reaction mixture is dissolved in ether and the quinoline removed by washing with dilute sulfuric acid. By means of a potassium hydroxide solution the phenolic compounds are isolated from the ethereal solution in an amount of 55 mgrs., yielding 30.5 mgrs. of the estradiol urea compound.

*Example 6*

0.3 gr. of androstadienolone, 4 ccs. of tetrahydro naphthalene and 0.1 gr. of a nickel catalyst are heated for 35 minutes to 350–360° C. On working up as described before 37 mgrs. of phenolic compounds are obtained, which partly crystallize on sprinkling with a little ether. On treatment with a methanol solution of urea no crystals are obtained, showing that in the presence of a nickel catalyst no estradiol is formed. The phenolic compounds are mixed with water, extracted with ether and recrystallized from a small amount of ether. Thus, crystals of M. P. 205–220° C. are obtained, the absorption spectrum of which is the same as that of estrone.

*Example 7*

0.3 gr. of androstadienolone, 0.5 cc. of acetic acid anhydride and 3.5 ccs. of tetrahydro naphthalene are heated to 360° C. for half an hour. The reaction mixture is then boiled for half an hour with a 5% solution of potassium hydroxide in methanol. When worked up according to Example 3, 116 mgrs. of phenolic compounds are recovered, yielding 35 mgrs. of the estradiol urea compound.

Instead of acetic acid anhydride also other acylating agents may be used, for example, other carboxylic acid anhydrides, so that instead of the acetic ester of androstadienolone also ether esters, the propionate, butyrate, valerianate, benzoate or the like may be formed or may be used as starting material for the process described.

*Example 8*

0.3 gr. of androstadienolone are heated to 365° C. with 4 ccs. of tetrahydro naphthalene for half an hour. Worked up according to Example 3, 77 mgrs. of a clear phenolic oil are obtained, yielding 48 mgrs. of the estradiol urea compound.

*Example 9*

0.3 gr. of androstadienolone and 4 ccs. of tetrahydro naphthalene are heated to 390–395° C. for half an hour, yielding, thus, 77 mgrs. of a clear phenolic oil and therefrom 31 mgrs. of the estradiol urea compound.

*Example 10*

0.3 gr. of androstadienolone and 4 ccs. of dihydro naphthalene are heated for half an hour to 370° C. 120 mgrs. of phenolic constituents are obtained corresponding to 40% of the starting material. Treatment with urea in methanol yields 70 mgrs. of the estradiol urea compound, corresponding to 58 mgrs. of estradiol. The yield of estradiol therefore amounts to 20.3% of its theoretical value.

Instead of androstadienolone also its enol derivatives may be used as starting materials, as the enol esters or enol ethers.

Of course, many other changes and variations in the reaction conditions, the starting materials used, the solvents and catalysts employed, and the like may be employed by those skilled in the art in accordance with the principles set forth herein and in the claims annexed hereto.

What I claim is:

1. A process for the production of estradiol compounds from $\Delta_{1,2;4,5}$-androstadienol-17-one-3 compounds, comprising, subjecting the starting materials to a thermic treatment and isolating from the reaction mixture the estradiol compound.

2. A process for the production of estradiol from $\Delta_{1,2;4,5}$-androstadienol-17-one-3, comprising, subjecting the starting material to a thermic treatment and isolating from the reaction mixture the estradiol.

3. A process for the production of estradiol from $\Delta_{1,2;4,5}$-androstadienol-17-one-3, comprising, subjecting the starting material to a thermic treatment and isolating from the reaction mixture the estradiol by means of its urea compounds.

4. A process for the production of an estradiol ester from an ester of $\Delta_{1,2;4,5}$-androstadienol-17-one-3, comprising, subjecting the starting material to a thermic treatment and isolating from the reaction mixture the estradiol ester.

5. A process for the production of an estradiol acetate from an acetate of $\Delta_{1,2;4,5}$-androstadienol-17-one-3, comprising, subjecting the starting material to a thermic treatment and isolating from the reaction mixture the estradiol acetate.

6. A process for the production of estradiol from an ester of $\Delta_{1,2;4,5}$-androstadienol-17-one-3, comprising subjecting the starting material to a thermic treatment, saponifying the estradiol ester formed and isolating the estradiol.

7. A process for the production of estradiol from an ester of $\Delta_{1,2;4,5}$-androstadienol-17-one-3, comprising subjecting the starting material to a thermic treatment, saponifying the estradiol ester formed and isolating the estradiol by means of its urea compound.

8. Process according to claim 1 wherein the heating is carried out under reduced pressure.

9. Process according to claim 4 wherein the heating is carried out under reduced pressure.

HANS HERLOFF INHOFFEN.